UNITED STATES PATENT OFFICE.

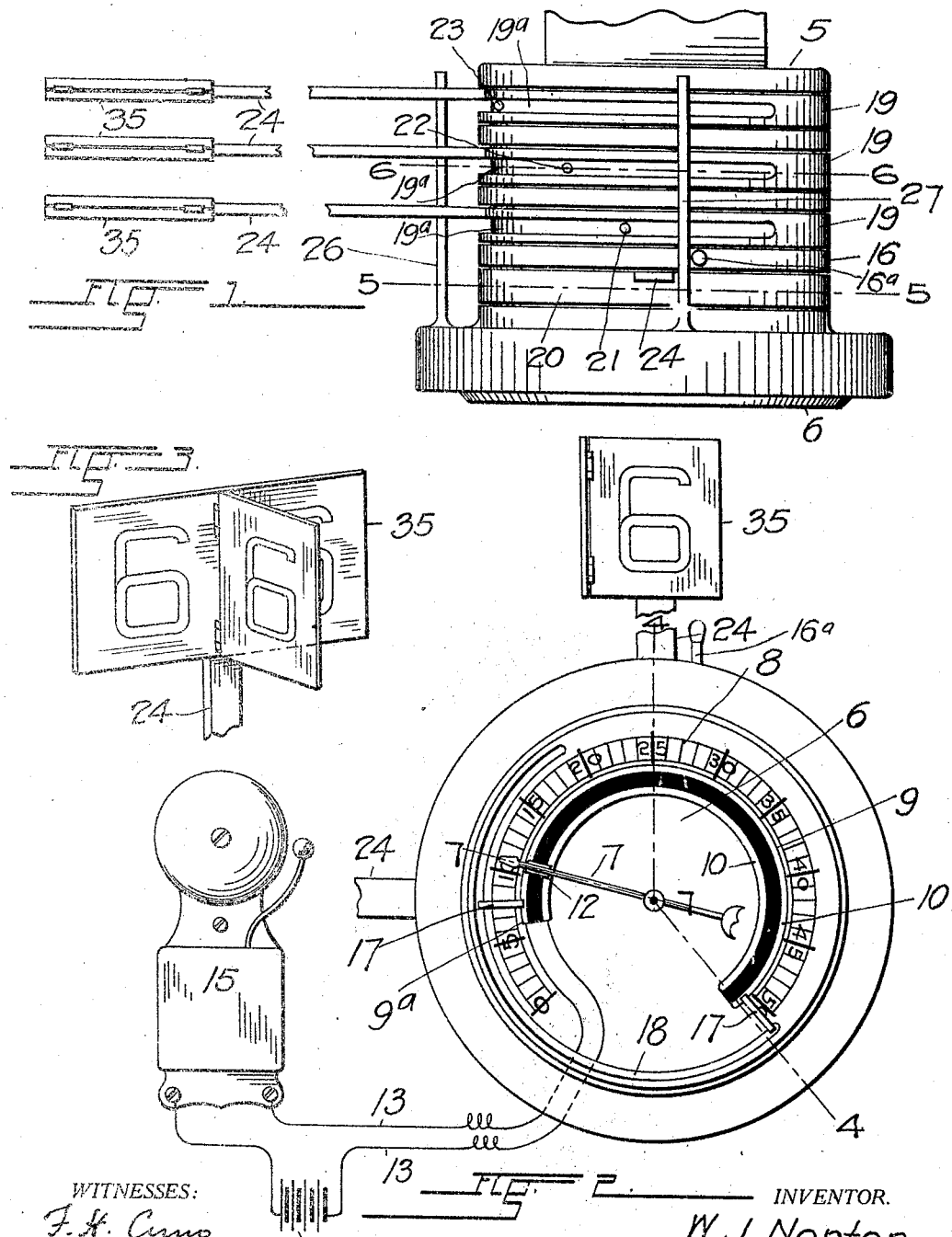

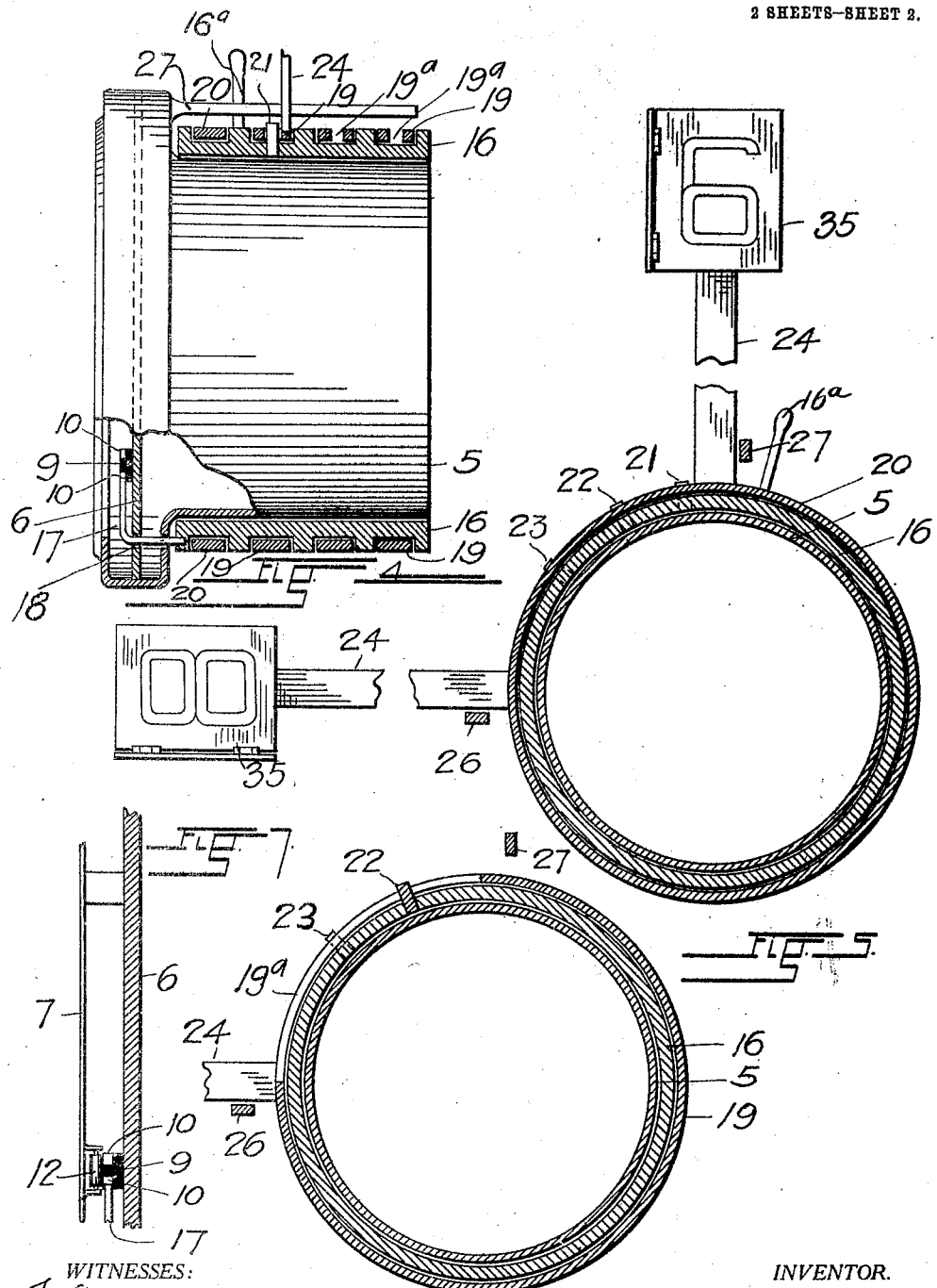

WILLIAM J. NORTON, OF DENVER, COLORADO, ASSIGNOR OF ONE-HALF TO HAMILTON ARMSTRONG, OF DENVER, COLORADO.

SIGNALING ATTACHMENT FOR SPEEDOMETERS.

996,120.  Specification of Letters Patent. Patented June 27, 1911.

Application filed August 4, 1909. Serial No. 511,186.

*To all whom it may concern:*

Be it known that I, WILLIAM J. NORTON, citizen of the United States of America, residing at Denver, in the county of Denver and State of Colorado, have invented certain new and useful Improvements in Signaling Attachments for Speedometers, of which the following is a specification.

This invention relates to a signaling attachment for instruments of the class known as speedometers or speed-counters which are designed to indicate the speed in miles per hour at which an automobile or other vehicle is propelled, by counting and recording the number of revolutions made in a given time, by a wheel thereof.

The object of my invention resides in the provision of a mechanism of simple construction which, in coöperation with the pointer or other movable part of the speed-indicating device to which it is attached, will audibly notify of an increase of speed of the vehicle beyond a determinate number of miles per hour, which number is visibly displayed upon an elevated signal associated with said mechanism.

The attachment includes a plurality of members which in coöperation with a part of the mechanism with which they are associated, provide an adjustment whereby the element by which the alarm is sounded may be positioned so as to be operated at any selected one of a number of different rates of speed indicated by the instrument with which the attachment is connected.

My invention is particularly adapted for use on vehicles in municipalities in which certain speed limits are prescribed by ordinance for different localities, as it compels the operator to display the maximum rate of speed at which he is allowed to travel, by a signal visible to observers along the road over which the vehicle is propelled, while increase of speed beyond said rate will be audibly announced by the before mentioned automatically operating alarm.

I attain the above named objects by the mechanism illustrated in the accompanying drawings, in the various views of which like parts are similarly designated and in which—

Figure 1, represents a plan view of a speed-indicating instrument provided with my attachment, Fig. 2, a face-view thereof, Fig. 3, a perspective view of the blade by which the selected rate of speed is visibly indicated, Fig. 4, a section taken along the line 4—4 Fig. 2, Fig. 5, a transverse section taken along the line 5—5 Fig. 1, Fig. 6, a similar section taken along the line 6—6 Fig. 1, and Fig. 7, a fragmentary section taken along the line 7—7 Fig. 2, drawn to an enlarged scale.

Referring to the drawings by numerical reference characters, let the numeral 5, indicate the cylindrical casing of a speed-indicating instrument, 6 the therewith associated dial and 7 the pointer which, by connection with the operating mechanism of the instrument, denotes on a graduated scale 8, printed on said dial, the rate of speed in miles per hour, at which the vehicle with which the instrument is connected, is propelled.

My improved signaling attachment comprises an arc-shaped element 9 composed of fiber or other insulating material which is disposed upon the dial in proximity to the circular scale 8, and which is adapted to move through an arc of predetermined length, in concentric relation thereto.

The member 9, is provided with two longitudinally extending separated, metallic contact plates 10 which are embedded in its upper surface, and the pointer 7 carries a roller 12 or other contact device which is adapted to simultaneously engage the two plates 10 for the purpose of completing an electric circuit of which said plates are the terminals.

The circuit above referred to, is composed of two flexible conductors, 13 which project through an opening in the casing 5, to separately connect with the plates 10 and which constitute the electrical connections between a source of electricity 14 and an electric gong 15.

To move the element 9 to any selected one of a plurality of determinate positions, and to simultaneously display by means of a signal, the point of the scale at which said element will be engaged by the pointer so as to close the electric circuit and sound the alarm, I provide a sleeve 16 which is revolubly mounted upon the cylindrical casing 5 and which is rigidly connected with the element 9 by means of arms 17, which project through an arcuate slot 18 in the dial 6.

Revolubly mounted in correspondingly formed depressions in the peripheral surface of the sleeve 16, are a plurality of rings, 19, which, with the exception of the first one, 20 are provided with longitudinally extending slots 19$^a$.

Secured upon the peripheral surface of the sleeve 16, are stops 21, 22 and 23 which project, respectively, through the slots 19$^a$ of the rings 19 and are disposed at distances from a central longitudinal line at the top of the sleeve, proportionate to the arcuate distances between the point of zero of the graduated scale 8 and the points of said scale which are indicative of the predetermined speed limits and which, in the instrument shown in the drawings, are coincident with the points respectively denoting rates of speed of 6, 8, 12, and 18 miles per hour.

Each of the rings 20 and 19 carries a radially projecting arm 24 which, at its upper extremity, is provided with a signal blade 35 upon which the rate of speed corresponding with the respective ring, is prominently displayed.

The blades 35 are preferably composed of two or more members connected by hinges, so that in the retracted position of the arm 24, they may be folded to occupy a small space, while when said arm is in the vertical or projected position, they are manually opened to render the number visible from different directions.

The rotatory movement of the rings 19 and the therewith connected arms 24 is limited to a quadrant arc, by means of stops 26, and 27 which projecting from the casing 5 in parallel relation to its axis are respectively engaged by the arms 24 when in a horizontal or vertical position.

A handle 16$^a$ projecting outwardly from the circumferential surface of the ring 16, is in the operation of the invention employed to return said ring and the therewith connected member 9, to their normal position prior to their adjustment from one rate of speed to another.

Having thus described the mechanical construction of my attachment, its operation will be readily understood.

When the element 9 is in its normal position, one of its extremities 9$^a$ is opposite a point on the scale 8, a short distance beyond that indicating a speed of 6 miles per hour which in this instance, is supposed to be the highest rate at which the vehicle is permitted to be propelled. The arm 24 of the ring 20 is, at the same time, placed in the vertical position shown in Fig. 2, so as to conspicuously display the blade at its upper extremity which carries the figure 6 corresponding with that on the scale. The other arms are in the retracted horizontal position, supported upon the stop 26, as shown in the same figure. Now, when the speed of the vehicle is increased beyond the 6 mile per hour limit, the pointer 12 will engage the contact plates 10 of the element, thereby closing the electric circuit and consequently sounding the alarm 15 until the speed is reduced to a rate of 6 miles or less.

If it is desired to impel the vehicle at a higher rate of speed, for example 12 miles per hour, the operator first moves the arm 24 on the ring 20 to the horizontal position after which he rotates the ring 19 corresponding with the selected speed limit, through a quadrant arc or until the arm 24 is perpendicular and engages the stop 27. During the rotatory movement of the ring 19, the end of its slot 19$^a$, engages the stop 22 on the sleeve 16 with the result that the latter and the therewith connected element 9, are moved about their axis through an arc proportionate to the distance between the numbers 6 and 12 on the graduated scale 8. The end 9$^a$ of the element 9 being thus positioned a short distance beyond the point of the scale indicative of a speed of 12 miles per hour, the alarm 15 will be sounded only when said rate is exceeded.

To adjust the mechanism for a lower or a higher rate of speed, for example 18 miles per hour, the arm 24 on the ring 19, corresponding with the 12 mark on the scale, is lowered, and the sleeve 16 and the therewith associated element 9 are returned to their original position by manipulation of the handle 16$^a$, after which the ring corresponding with the 18 miles per hour point on the scale, is rotated by raising the therewith connected arm from the horizontal to the vertical position. The stop 23 which, during this movement, is engaged by the end of the slot 19$^a$, causes the sleeve 16 to move through an arc of sufficient length to bring the end 9$^a$ of the element 9 opposite the 18 point on the scale.

Although the arrangement and proportions of the various members comprised in my improved signaling mechanism, may be varied within the spirit of my invention, it is preferable that the length of the arms 24 and the size of the blades at their upper ends, are such that the latter when in a vertical position, will be conspicuously displayed, as for instance, above the hood at the front of an automobile, and the numbers upon said blades will be clearly visible at a considerable distance. As the construction of such protective means is obvious and variable in accordance with the construction of the vehicle and the location of the speed-indicating device, it has not been shown in the drawings.

Having thus described my invention what I claim and desire to secure by Letters Patent is:

1. In an apparatus of the class described, the combination with a speed indicating instrument including a dial having an arcuate, graduated scale, of an electric alarm, an element carrying two insulated arcuate contact plates in a circuit with said alarm, said element being movably mounted on said instrument with the two contact plates in concentric relation to said scale, means for adjusting the position of said element so that corresponding extremities of the contact plates at one end thereof may be brought in radial alinement with any graduation of said scale, a pointer pivotally mounted on said dial and a contact device associated with said pointer and adapted to simultaneously engage the two contact plates so as to close the circuit in which they are located.

2. In an apparatus of the class described, the combination with a speed-indicating instrument including a dial having a graduated scale and a pointer pivotally mounted on said dial, of a contact-device carried by said pointer, an electric alarm, an element carrying insulated arcuate contact-plates in a circuit therewith and adapted to be simultaneously engaged by said device, said element being movable about a center coincident with the pivotal center of said pointer, means for adjusting the position of said element so that corresponding extremities of said plates are in radial alinement with any one of a number of selected points in said scale, and indicatory devices operatively connected with said means, whereby the position of said element relative to the scale, is indicated at a point remote from said dial.

3. In an apparatus of the class described, the combination with a speed-indicating instrument including a dial having a graduated scale and a pointer pivotally mounted on said dial, of a member revoluble about an axis coincident with that of said pointer, an element connected with said member, disposed upon said dial and having insulated contact-plates, an electric alarm in a circuit with said plates, a contact device on said pointer adapted to simultaneously engage said plates so as to close the circuit; a means adapted to move said member through an arc of predetermined length whereby corresponding ends of said contact-plates are brought in radial alinement with a selected point in said scale, and a signal carried by said means whereby the position of said element relative to said scale, is indicated at a point remote from the dial.

4. In an apparatus of the class described, the combination with a speed-indicating instrument including a dial having a graduated scale and a pointer pivotally mounted on said dial, of a member revoluble about an axis coincident with that of said pointer, an element connected with said member, disposed upon said dial and having insulated contact-plates, an electric alarm in a circuit with said plates, a contact device on said pointer adapted to simultaneously engage said plates so as to close the circuit, a plurality of operating devices operatively connected with said member to separately move the same through arcs of predetermined lengths, whereby corresponding ends of said contact plates are brought in radial alinement with a selected one of a number of predetermined points in said scale and signals carried by said operating devices, whereby the position of said element relative to said scale, is indicated at a point remote from the dial.

5. In an apparatus of the class described, the combination with a speed indicating instrument including a cylindrical casing, a dial having a graduated scale, at one end thereof and a pointer pivotally mounted on said dial, of a sleeve revolubly surrounding said casing, an element connected with said sleeve disposed upon said dial and having insulated contact plates, an electric alarm in a circuit with said plates a contact device on said pointer adapted to simultaneously engage said plates so as to close the circuit, a ring revoluble upon said sleeve through an arc of predetermined length, and coöperative means on said ring and said sleeve whereby the movement of the former is communicated to the latter so as to bring corresponding extremities of the contact plates in radial alinement with a selected point in said scale.

6. In an apparatus of the class described, the combination with a speed indicating instrument including a cylindrical casing, a dial having a graduated scale, at one end thereof, and a pointer pivotally mounted on said dial, of a sleeve revolubly surrounding said casing, an element connected with said sleeve, disposed upon said dial and having insulated contact plates, an electric alarm in a circuit with said plates, a contact device on said pointer adapted to simultaneously engage said plates so as to close the circuit, a plurality of rings revoluble upon said sleeve through arcs of predetermined lengths, and coöperative means on said rings and on said sleeve whereby the movement of any one of the former is communicated to the latter so as to bring the ends of the contact plates at one extremity of said element in radial alinement with selected points in said scale.

7. In an apparatus of the class described, the combination with a speed indicating instrument, including a cylindrical casing, a dial having a graduated scale, at one end thereof, and a pointer pivotally mounted on said dial, of a sleeve revolubly surrounding said casing, an element connected with said sleeve, disposed upon said dial and having insulated contact plates, an electric alarm in a circuit with said plates, a contact device on said pointer adapted to simultaneously engage said plates so as to close the circuit, a ring revoluble upon said sleeve through an arc of predetermined length, coöperative means on said ring and said sleeve whereby movement of the former is communicated to the latter so as to bring corresponding extremities of the contact-plates in radial alinement with a selected point in said scale, and a signal carried by said ring whereby the position of said element relative to said scale is indicated at a point remote from the dial.

8. In an apparatus of the class described, the combination with a speed indicating instrument including a cylindrical casing, a dial having a graduated scale, at one end thereof and a pointer pivotally mounted on said dial, of a sleeve, revolubly surrounding said casing, an element connected with said sleeve disposed upon said dial and having insulated contact plates, an electric alarm in a circuit with said plates, a contact device on said pointer adapted to simultaneously engage said plates so as to close the circuit, a ring revoluble upon said sleeve through an arc of predetermined length and having a longitudinal slot, and a pin on said sleeve projecting through said slot and disposed to be engaged by an end thereof at a predetermined point in the movement of said ring.

9. In an apparatus of the class described, the combination with a speed indicating instrument including a cylindrical casing, a dial having a graduated scale, at one end thereof and a pointer pivotally mounted on said dial, of a sleeve revolubly surrounding said casing, an element connected with said sleeve disposed upon said dial and having insulated contact plates, an electric alarm in a circuit with said plates, a contact device on said pointer adapted to simultaneously engage said plates so as to close the circuit, a ring revoluble upon said sleeve through an arc of predetermined length, coöperative means on said ring and said sleeve whereby movement of the former is communicated to the latter so as to bring corresponding extremities of the contact-plates in radial alinement with a selected point in said scale and an arm radially projecting from said ring and carrying at its extremity a signal indicative of the position of said element relative to said scale.

10. In an apparatus of the class described, the combination with a speed-indicating instrument including a dial having a graduated scale and a pointer pivotally mounted thereon, of an element movable on said dial and having insulated contact plates, an electric alarm in a circuit with said plates, a contact device on the pointer adapted to simultaneously engage said plates so as to close the circuit, means for moving said element to a selected point in said scale, and a signal operatively connected with said means whereby the position of said element relative to said scale is indicated at a point remote from the dial.

11. In an apparatus of the class described, the combination with a speed-indicating instrument, of an electric circuit, an alarm included therein, coöperative contact members adapted to close said circuit when in engagement, one of said members being carried upon an operating part of said instrument, means for adjusting the other member to any one of a plurality of predetermined positions in the path of the first named member, and a signaling appliance connected with said means whereby the position of said member relative to a fixed point on said instrument is indicated at a point remote therefrom.

12. In an apparatus of the class described, the combination with a speed indicating instrument, of an alarm, a member connected with an operating part of said instrument, a second member adjustable in the path of the first named member to be operatively engaged thereby, means actuated by the engagement of said members, to sound the alarm, and a signaling appliance operatively connected with the adjustable member whereby its position relative to a fixed point on the instrument is indicated at a point remote therefrom.

13. In an apparatus of the class described, the combination with a speed indicating instrument including a dial having a graduated scale and a pointer pivotally mounted thereon, of a contact device, movable to correspond with a selected point on said scale, an electric alarm in an electric circuit with the said device, a signaling appliance operatively connected with the said device and constructed to indicate its position relative to the scale at a point remote therefrom, and means connected with said pointer and constructed to engage said contact device so as to close the circuit in which it is located.

14. In an apparatus of the class described, the combination with a speed indicating instrument, of an electric circuit, an alarm included therein, coöperative contact members adapted to close said circuit when in engagement, one of said members being operatively connected with an operating part of said instrument while the other member is adjustable to a selected position in the path of the other member, and a signaling appliance operatively connected with the adjustable member whereby its position relative to a fixed point on the instrument is indicated at a point remote therefrom.

In testimony whereof I have affixed my signature in presence of two witnesses.

WILLIAM J. NORTON.

Witnesses:
M. L. GEARY,
F. H. CUNO.

---

Copies of this patent may be obtained for five cents each, by addressing the "Commissioner of Patents, Washington, D. C."